United States Patent [19]

Layton

[11] Patent Number: 4,493,333
[45] Date of Patent: Jan. 15, 1985

[54] CORROSION-RESISTANT WORK TRANSFER SYSTEM

[75] Inventor: Howard M. Layton, New Fairfield, Conn.

[73] Assignee: Interlab, Inc., Danbury, Conn.

[21] Appl. No.: 494,383

[22] Filed: May 13, 1983

Related U.S. Application Data

[63] Continuation-in-part of Ser. No. 443,894, Nov. 23, 1982, Pat. No. 4,466,454.

[51] Int. Cl.³ .............................................. B08B 3/04
[52] U.S. Cl. ...................................... 134/76; 134/82; 134/140
[58] Field of Search .................... 134/76, 61, 82, 137, 134/140

[56] References Cited

U.S. PATENT DOCUMENTS

| | | | |
|---|---|---|---|
| 2,036,261 | 4/1936 | Dinley | 134/76 |
| 3,144,030 | 8/1964 | Donovan | 134/76 |
| 3,335,839 | 8/1967 | Neumann | 134/76 |
| 3,699,983 | 10/1972 | Morley | 134/76 |

Primary Examiner—John W. Shepperd
Assistant Examiner—Reneé S. Kidorf
Attorney, Agent, or Firm—Michael Ebert

[57] ABSTRACT

A mechanized work transfer system in which a robot assembly riding on a horizontal rail and driven by an external motor acts to convey a basket carrying work along a row of processing stages on a work bench. The assembly includes a robot provided with an elevator operated by an internal motor which serves to lower the basket at each stage on the work bench and to deposit it into a processing tank for a predetermined dwell period, after which the basket is hoisted out of the tank and transferred to another stage where the procedure is repeated. To render the assembly substantially immune to corrosive vapors emanating from the tanks, the robot housing is sectioned into left and right compartments, the left compartment being reserved for those moving and stationary components which can be fabricated of corrosion-resistant materials. The right compartment is reserved for the internal motor and other metal components which are vulnerable to corrosive vapors, this compartment being purged by a gas to prevent the entry of vapors therein.

9 Claims, 5 Drawing Figures

CORROSION-RESISTANT WORK TRANSFER SYSTEM

RELATED APPLICATION

This application is a continuation-in-part of my copending application Ser. No. 443,894, filed Nov. 23, 1982, now U.S. Pat. No. 4,466,454 whose entire disclosure is incorporated herein by reference.

BACKGROUND OF INVENTION

FIELD OF INVENTION

This invention relates generally to mechanical transfer mechanisms for conveying work at a work station from one stage to another, and in particular to an automated work transfer system for conveying a basket carrying work through a row of processing stages in any desired sequence, the stages being of the type which employ highly corrosive chemicals such as those used in the fabrication of microelectronic devices.

By using diffusion techniques it is now possible to fabricate transistors and diodes as well as resistors and capacitors within a single wafer of silicon to create integrated circuits. The manufacture of microelectronic devices entails sequences of photolithography, etching and critical cleaning processes. For the most part, these have heretofore been carried out manually at chemistry work benches. In the usual manufacturing procedure, batches of substrates or silicon wafers are carried in "boats" and transferred from one chemical tank to another by a human operator who adjusts the conditions prevailing in each tank and also determines the periods during which the boat dwells in the respective tanks for treatment therein.

While automated transfer operations are now commonplace in many industrial processes including electroplating, there are a number of practical factors which have until the present time militated against the introduction of automation in the processing of microelectronic devices. A major factor is that the value of the microelectronic devices is high relative to the cost of labor involved in making these parts. Thus the introduction of automated work transfer mechanisms to reduce labor costs may not be economically justified, particularly when one takes into account the capital investment dictated by automated equipment.

But other factors now come into play which have little to do with the cost effectiveness of replacing manual operations with automated work transfer mechanisms. As microelectronic devices become increasingly complex and sophisticated, the associated wet chemistry procedures are rendered even more critical. As a consequence, the variables and human errors incidental to manual operation can no longer be tolerated, for repeatability and consistency are now the primary desiderata. Hence, these considerations may override the cost effectiveness factor.

Though efforts have been made to automate work transfer operations in wet chemistry processing of microelectronic devices, they have had limited success, largely because of certain environmental problems. Many of the chemical processing tanks used in micro device and wafer processing act to discharge corrosive vapors into the work area in the region immediately above the process tanks. Since the hoist is for the most part required to operate within this corrosive environment, the freely moving, unanchored hoist (or robot) type of work transfer mechanism such as are employed in the printed circuit board plating industry have not been readily adaptable to this very different and specialized type of use. Instead, fixed-sequence transfer mechanisms have been quite widely used. These enjoy the advantage of lesser vulnerability to the corrosive environment by reason of the reduced complexity of that part of the mechanism which is exposed to the environment. However, they suffer from the limitation that work transfer takes place only between two immediately adjacent tanks. In general, a single common processing cycle time must be used.

As a consequence, the corrosive nature of the environment associated with many of the wet chemistry processes in microelectronic device and wafer fabrication has hitherto tended to discourage the use of the unanchored, horizontally free tracking hoist (or robot) in this industry.

In my above-identified copending application whose entire disclosure is incorporated herein by reference, a work transfer system is disclosed in which a robot is provided having a hand adapted to grasp the handle of the basket and to manipulate the basket in accordance with programmed instructions, whereby the basket may be made to carry work along a row of processing stages in a work station in any desired sequence. In that system, the entire transfer mechanism, but for the robot hand and its supporting arms, lies outside of the corrosive environment and need not, therefore, be protected against corrosion.

However, in some work station arrangements, by reason of cost and other factors, it is not feasible to provide a system in which the robot operates outside of the corrosive environment; hence there is a need to provide an arrangement whose robot assembly is exposed to a corrosive environment, yet is resistant thereto so that the mechanism will not be adversely affected thereby.

SUMMARY OF INVENTION

In view of the foregoing, the main object of this invention is to provide a corrosion-resistant automated work transfer system for conveying a basket carrying work through a row of chemical processing stages in a work station in any desired sequence, the system including a robot assembly whose hand is able to engage the handle of the work basket and to manipulate the basket in accordance with programmed instructions.

A significant feature of the invention resides in the fact that such component parts of the robot assembly, whether static or moving, as are exposed to the corrosive environment are non-metallic in nature and are constructed of materials which render it impervious to the prevailing corrosive vapors. Those component parts of the assembly which do not lend themselves to non-metallic construction (for example, drive motors, clutches and brakes) are either sealed within a separate section of the assembly, which section is maintained free of corrosive vapors by means of air or nitrogen purging, or, they are located in that part of the hoist assembly which is isolated from the corrosive environment by means of a dividing wall or apron and/or a flowing air curtain.

OUTLINE OF DRAWINGS

For a better understanding as well as other objects and further features thereof, reference is made to the following detailed description to be read in conjunction with the accompanying drawings, wherein.

DESCRIPTION OF INVENTION

Figure 1:
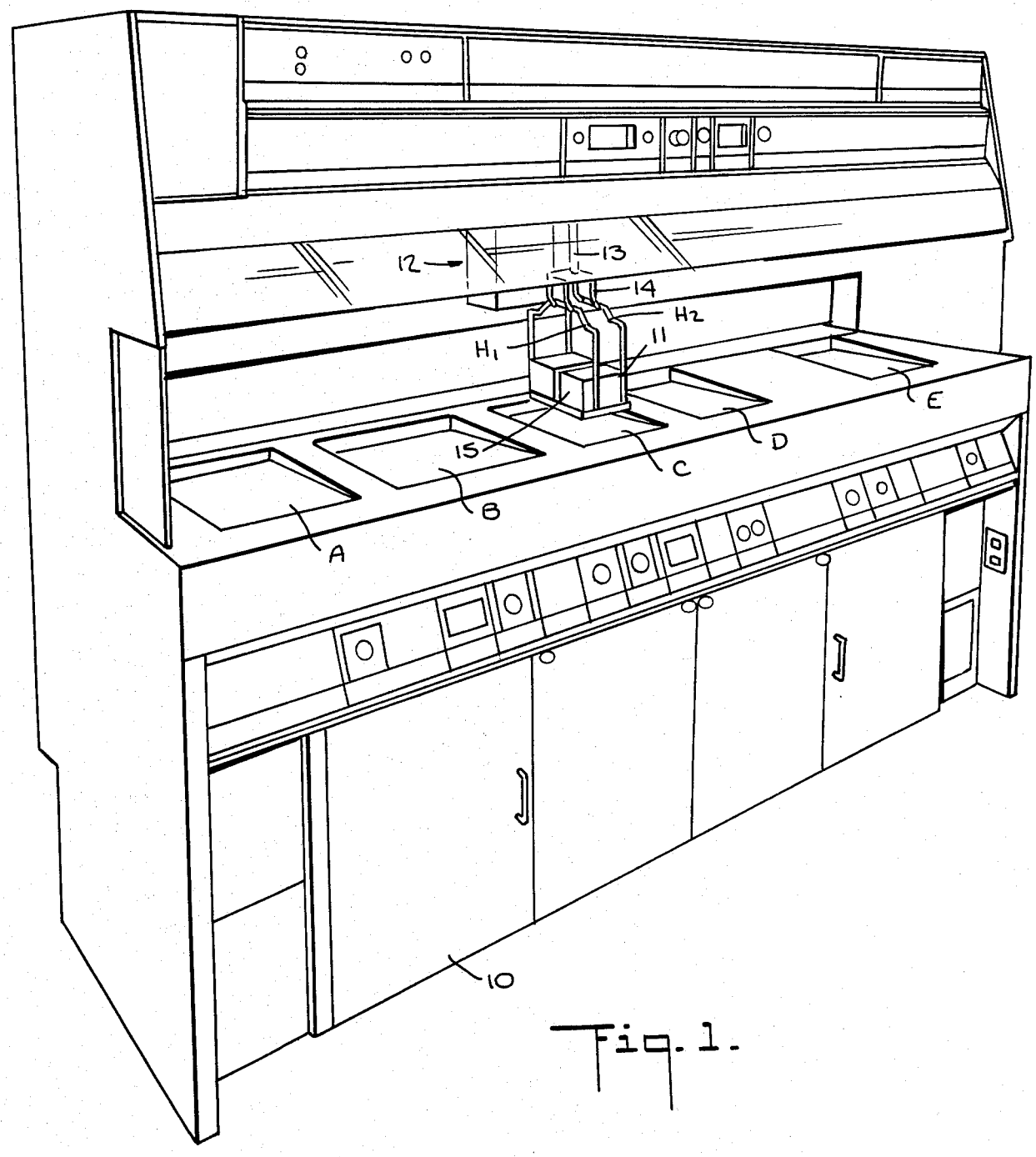
FIG. 1 is a perspective view of a wet chemistry work station which incorporates an automated work transfer system having a robot assembly in accordance with the invention.

Referring now to FIG. 1, there is shown a wet chemistry work station provided with a work bench 10 of conventional design on which there is a row of chemical processing stages A, B, C, etc., each having a flanged tank adapted to receive a basket or cradle 11 carrying the work to be processed. The number of stages, the nature of the chemical processing, and the operating sequence form no part of the present invention, which is applicable to any wet chemistry work station that emits corrosive vapors.

Riding on a horizontal path above the row of work stages is a robot 12 provided with an elevator which acts to raise or lower a hoisting arm 13 whose free end terminates in a hand 14 having two pairs of V-shaped flat fingers. These function as hooks to engage the double handles $H_1$ and $H_2$ of basket 11 which carries work pieces 15 to be processed to the various stages on the work bench. To engage the handles of the basket, the fingers of the hand are brought under the handles and then raised, this action requiring movement of hoisting arm 13 in the X and Y directions. Movement in the X direction is effected by displacing the robot along its horizontal path, and the Y direction by vertical movement of the robot elevator. The reverse procedure is used for disengagement.

Figure 2:
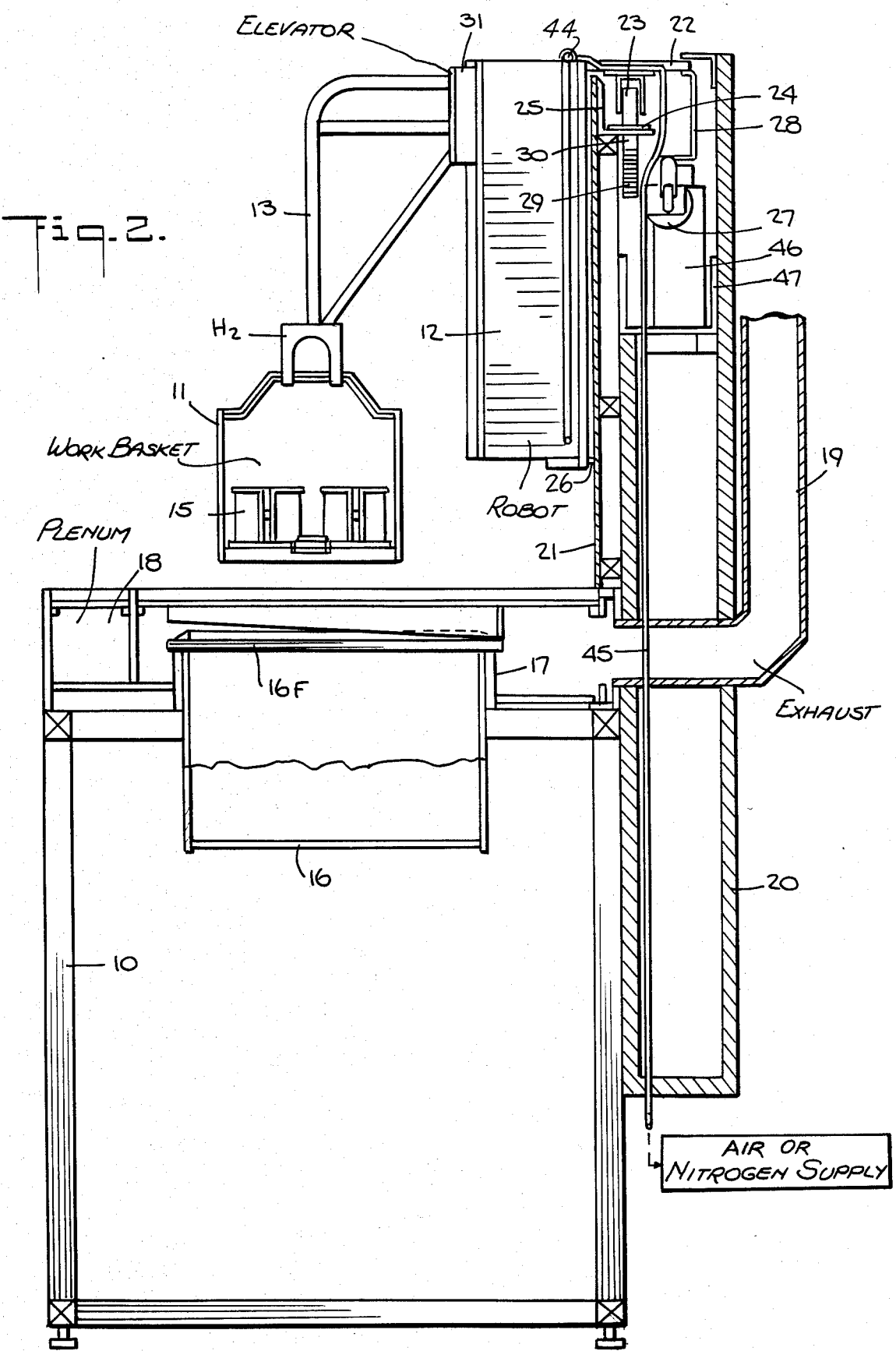
FIG. 2 is an end cross-section view of the work station and the robot assembly in accordance with the invention.

Referring now to FIG. 2, which illustrates the work station in a side view and shows only one of the processing tanks designated by numeral 16, it will be seen that this tank is suspended in a mounting chimney 17 supported by the understructure of work bench 10. This bench also supports a work area air plenum 18.

This construction is conventional for a standard, manually-operated wet chemistry etching station in which corrosive fumes emitted from the tanks are, for the most part, drawn into air plenum 18 and directed into an exhaust system through an exhaust duct 19. The chemical process tanks represented by tank 16 are subsurface mounted in the air plenum so as to permit peripheral exhaust around upper flange 16F of the tank and to create a flow between the flange and the work surface.

In order to add a corrosion-resistant work transfer system to this standard work bench, a rear support frame 20 is positioned behind and bolted to the rear of the understructure of work bench 10. Mounted above work bench 10 at the rear thereof is a corrosion-resistant synthetic plastic divider apron 21. This apron, which acts as a protective barrier, is interposed between robot 12 and rear support frame 20 and functions to isolate the work area in front of the apron from the framework and mechanisms set up behind the apron.

Figure 3:
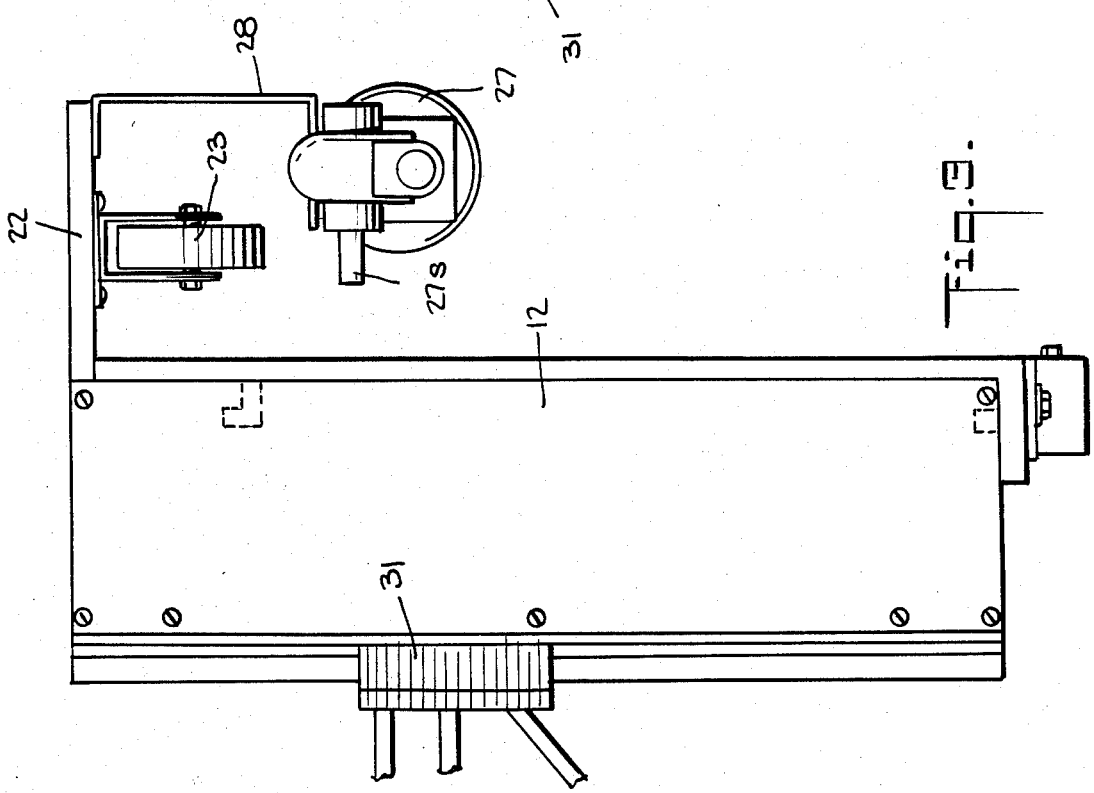
FIG. 3 is a separate side view of the robot assembly.

As best seen in FIGS. 2 and 3, the robot assembly, which includes robot 12, is provided with a supporting plate 22 extending from the upper end of robot 12 over the top of apron 21, load-bearing wheels 23 being supported below this plate behind the apron. These wheels ride along a track 24 attached onto a load-bearing angle 25 mounted on the rear of apron 21 at the upper end thereof. Thus robot 12 is cantilevered from apron 21, the resultant load being carried by small guidewheels 26 which ride along the front of the apron.

To move the robot assembly in a horizontal path along track 24, a horizontal drive motor 27 is provided which is external to robot 12, this motor and its associated gear reducer being suspended from the underside of plate 22 by a bracket 28. The output shaft 27S of drive motor 27 is connected to a pinion 29 which engage a longitudinally-extending rack 30 attached to the underface of angle 25.

Thus when power is applied to external motor 27, the transfer mechanism is moved along the horizontal track 24 in a direction depending on the polarity of the applied voltage. Because robot 12 is hung over the top of divider apron 21, the robot, which is in front of the apron, is exposed to corrosive vapors emerging from the processing tanks, but external motor 27, horizontal track 24 and all other components disposed behind the apron are isolated from these vapors. Hence these components may be of conventional construction and need not be made of corrosion-resistant materials.

In some applications, the processing console shown in the figures may be furnished with a laminar flow clean air supply assembly mounted above the work bench, or with a simple fume exhaust hood which serves to enclose the work area so as to limit the spread of corrosive fumes. In other applications where the room itself furnishes a sufficiently clean environment for the process being carried out, the console may be used as shown without any added superstructure or hood; for then the existing air plenum 18 may be considered sufficient for adequate removal of corrosive vapors. But regardless of the type of process console and hood enclosure used, the mechanism transfer system and supports therefor as shown herein remain substantially unchanged.

Robot 12 incorporates an elevator driven by an internal motor, the elevator taking the form of a carriage 31 to which hoisting arm 13 is attached, the carriage running up and down the front face of the robot to raise and lower basket 11, as required.

Figure 5:
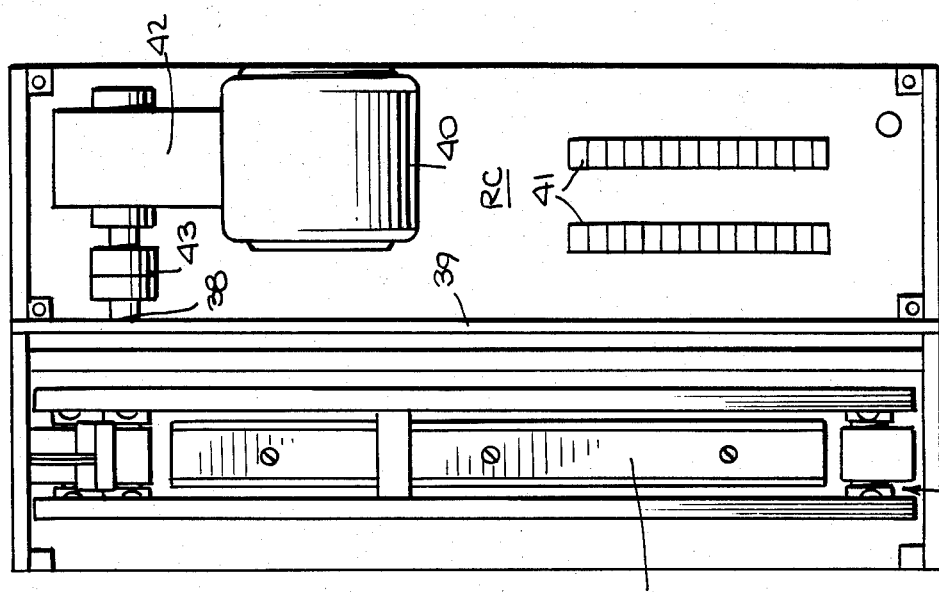
FIG. 5 is a longitudinal section taken through the robot assembly which shows both compartments therein.
Figure 4:
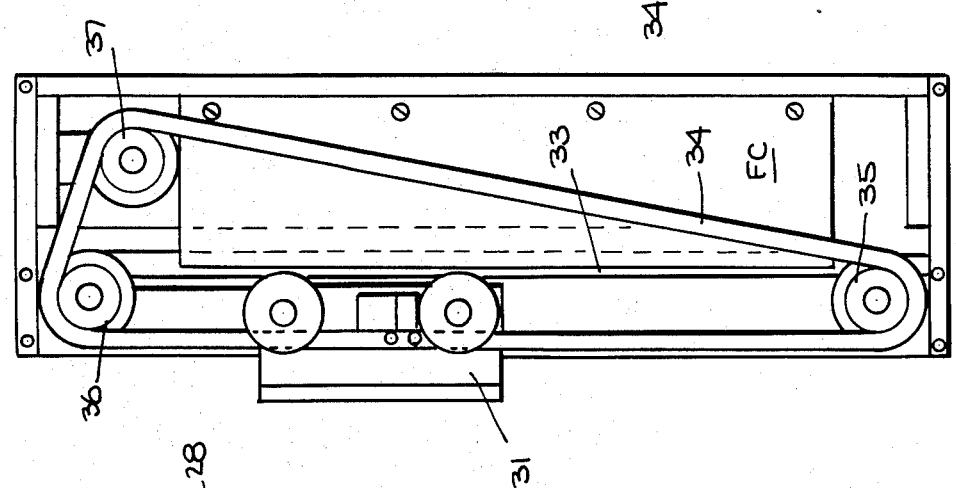
FIG. 4 is a transverse sectional view through that compartment of the robot assembly which operates within the corrosive environment, the outer panels being removed.

As shown in FIGS. 4 and 5, carriage 31 is provided with wheels 32 which run on a vertical track 33 in the robot, the carriage being linked to an endless drive chain 34 looped between upper and lower idler sprocket wheels 35 and 36 and a drive sprocket wheel 37.

The robot housing is partitioned by a vertical panel 39 into left and right compartments FC and RC. The left compartment FC, as shown in FIG. 4, is reserved for endless chain 34, carriage wheels 32 and sprocket wheels 35, 36 and 37. The right compartment RC is reserved for an internal motor 40 and a terminal board 41, motor 40 being coupled by a gear reducer 42 through a clutch 43 to drive shaft 38 for the sprocket wheel 37. Thus when motor 40 is powered, elevator carriage 31 is caused by the sprocket chain to move up or down to raise or lower the work basket as required.

The external and internal motors are of the D-C type and therefore turn in a direction determined by the polarity of the applied direct voltage. The motors are connected by a flexible cable to a programmed microcomputer located at the work station or at a remote position, the computer acting to feed D-C power from a power supply to the respective motors in a polarity and for a duration sufficient to produce the number of motor revolutions in a duration sufficient to produce the number of motor revolutions in a direction necessary to execute the program for a given processing procedure.

Thus the X-axis external motor 27, when energized, will advance the robot assembly to the left or right to a point at which hand 14 is in alignment with a selected stage of the work bench, the selection being determined by the program. Then when Y-axis internal motor 40 is energized, it will act to lower hand 14 and work basket 11 held thereby into the tank of the selected stage. The program for the computer is such as to carry out a desired processing procedure and includes the dwell period at each tank. Hence when work is loaded into the basket the processing procedure at the work station is entirely automatic.

The left compartment FC of the robot, because it has a long vertical slot therein to permit movement of the elevator carriage 31, is exposed to chemical fumes emanating from the tanks on the work bench therebelow and therefore operates within a corrosive environment. Hence it is essential that all components housed in left compartment FC be fabricated from suitable, corrosion-resistant materials. Thus drive chain 34 may be fabricated of flexible PVDP (polyvinylidene), PVC (polyvinyl chloride), "TEFLON" (PTFE) or polypropylene.

The sprocket and carriage wheels as well as carriage 31 and the panels which form the housing of robot 12 are fabricated of similar corrosion-resistant, non-metallic materials, this being true also of shaft 38 of the drive sprocket wheel 37 which extends into rear compartment RC. As a consequence, all of the components housed in left compartment FC as well as the arms extending from carriage 31 and basket 11 are of non-metallic corrosion-resistant plastic material and have acceptable structural strength.

Right compartment RC contains internal motor 40, gear reducer 42 and clutch 43, all of which have a structure largely metallic in nature and corrodable. Because these components are subject to corrosive vapors, in order to protect them, rear compartment RC is sealed and is provided with a gas inlet port 44. As shown in FIG. 2, this inlet port is coupled to a flexible gas hose 45 to which air or nitrogen is supplied.

This gas serves to purge the interior of right compartment RC, any escaping gas bleeding through the bore in the compartment partition panel 39 through which shaft 38 passes. In practice, the gas in right compartment RC is kept under positive pressure with respect to the outside environment to prevent ingress of corrosive vapors. Flexible hose 45 is articulated so as to permit it to follow movement of the robot.

As shown in FIG. 2, the umbilical electrical cord between the robot assembly motors and the control computer therefor may take the form of a folding flat ribbon cable 46 moving in a trough 47 lying within framework 20.

Thus in a work transfer system in accordance with the invention, those components of the robot assembly which lie behind the protective barrier formed by apron 21 are thereby isolated from corrosive vapors emanating from the work bench, and the components which are in front of the apron and therefore subject to attack by the vapors are made of corrosion-resistant materials, except for those which are necessarily of metallic construction, these being housed in a sealed compartment which is purged by gas under positive pressure.

While there has been shown and described a preferred embodiment of a corrosion-resistant work transfer system in accordance with the invention, it will be appreciated that many changes and modifications may be made therein without, however, departing from the essential spirit thereof.

I claim:

1. In combination with a work station provided with a bench having a row of chemical processing stages thereon, each having a tank adapted to receive a handled basket carrying the work, the environment above the stages being chemically corrosive, and an automated work transfer system to convey said basket in a desired sequence to said stages, said system comprising:
   A. An apron vertically mounted above said work bench at the rear thereof to provide a barrier between said corrosive environment and the region behind the apron; said apron at its rear supporting a horizontal track adjacent the top of the apron;
   B. a robot assembly riding on said track, said assembly including a robot positioned in front of said apron, a plate extending from the upper end of the robot and projecting over the top of the apron into said rear region, load-bearing wheels supported by said plate and running on said track, a horizontal rack mounted below said track, and an external motor supported from said plate, the shaft of the motor having a pinion thereon which engages said rack to cause said assembly to travel along said track to a position in line with a selected tank in said row;
   C. an elevator carriage which rides up and down the front face of the robot and is provided with a hoisting arm having a hand adapted to engage the handle of said basket, said carriage being driven by an internal motor disposed in said robot to cause the carriage to lower the basket into the selected tank and to thereafter lift the basket therefrom.

2. The combination as set forth in claim 1, wherein said robot is provided with a guide wheel which rides along the front of the apron.

3. The combination as set forth in claim 1, wherein said work bench is provided with an air plenum to draw the vapors emerging from the tanks into an exhaust duct.

4. The combination as set forth in claim 1, wherein said robot is provided with a housing fabricated of corrosion resistant plastic panels.

5. The combination as set forth in claim 4, wherein said housing is divided by a partition into left and right compartments, the left compartment having sprocket wheels therein to support an endless chain which is linked to said carriage, said right compartment having said internal motor therein which is coupled to the shaft of one of said sprocket wheels through said partition.

6. The combination as set forth in claim 5, wherein all of the components in said left. compartments are formed of corrosion-resistant plastic material.

7. The combination as set forth in claim 6, wherein said material is polyvinylidene.

8. The combination as set forth in claim 5, wherein said right compartment is sealed and is purged with a gas under positive pressure.

9. The combination as set forth in claim 8, wherein said gas is nitrogen and is supplied by a flexible hose to an inlet in said right compartment.

* * * * *